United States Patent [19]

Sabin et al.

[11] Patent Number: 4,604,902

[45] Date of Patent: Aug. 12, 1986

[54] MEANS AND TECHNIQUES USEFUL IN MASS FLOWMETERS FOR MULTIPHASE FLOWS

[75] Inventors: Cullen M. Sabin, Solana Beach; Heinz F. Poppendiek, La Jolla, both of Calif.

[73] Assignee: Geoscience Ltd, Solana Beach, Calif.

[21] Appl. No.: 664,231

[22] Filed: Oct. 24, 1984

[51] Int. Cl.$^4$ ............................ G01F 1/44; G01F 1/68
[52] U.S. Cl. .................................. 73/861.04; 73/196; 73/204; 73/861.44; 364/510
[58] Field of Search ........... 73/861.04, 861.44, 861.48, 73/861.47, 195, 196, 204, 861.63; 364/510

[56] References Cited

U.S. PATENT DOCUMENTS 3,304,766  2/1967  Hubby .................................. 73/204
3,802,264  4/1974  Poppendiek et al. .................. 73/204

FOREIGN PATENT DOCUMENTS 0103616  6/1983  Japan .............................. 73/861.04

Primary Examiner—Donald O. Woodiel
Attorney, Agent, or Firm—Frank E. Mauritz

[57] ABSTRACT

A mixture of two materials flows through a first measuring station which includes a Venturi meter for obtaining and measuring a pressure difference $\Delta p$ that is representative of mass flow rate of the mixture and velocity. The mixture then flows through a second measuring station which includes a temperature differential flowmeter in which a predetermined amount of heat is supplied to heat the flowing mixture and raise its temperature to obtain and measure a corresponding change in temperature that is related to the mean density of the mixture and also the square of the mass flow rate. These values $\Delta p$ and $\Delta t$ are inputs to computer means which functions to solve a third order polynomial or cubic equation and express that solution in terms of the mixture ratio and flow rates of the individual components and the flow rate of the mixture itself.

6 Claims, 1 Drawing Figure

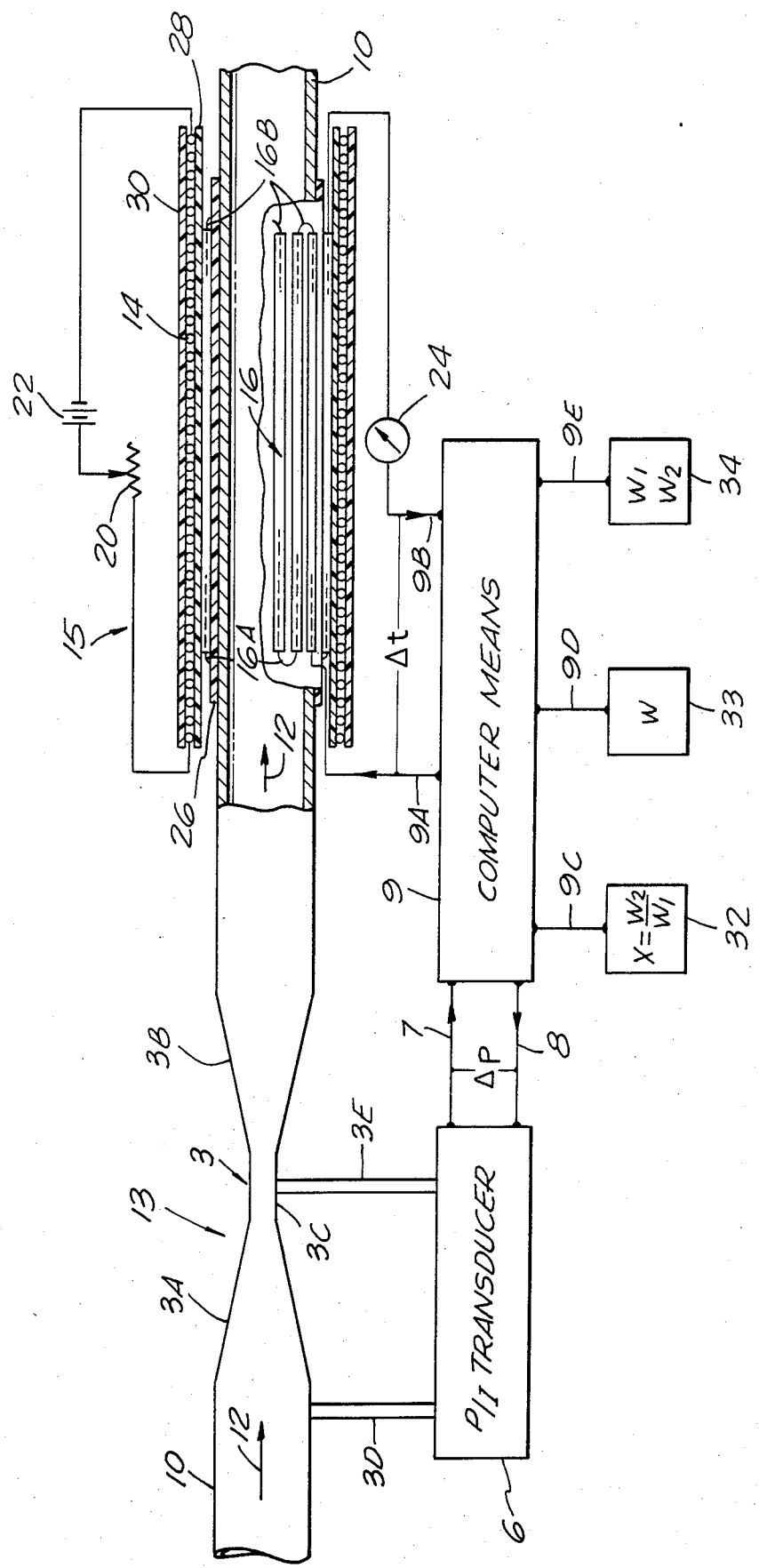

MEANS AND TECHNIQUES USEFUL IN MASS FLOWMETERS FOR MULTIPHASE FLOWS

The present invention relates to means and techniques for metering the the flow of a mixture of two materials and deriving information, on a continuous basis, as to the mixture ratio of the materials and also their flow rates.

The two-component material mixture which is metered may be a slurry consisting of, for example, a mixture of water and fossil fuel such as coal and the measurements made are useful in, for example, energy and power systems to which the mixture is fed to achieve a control on a continuous basis, of, for example, firing rate, air-fuel ratio, emissions production etc. Instead of a slurry containing water as a component, this new metering system is applicable also for use in metering other two-component mixtures such as, for example, a mixture of gas-conveyed solid particles or a homogeneous or inhomogeneous mixture of two immiscible liquids, or a flow of liquid entrained in a gas. The metering is accomplished and the above mentioned results are obtained without the necessity of the two materials or phases being separated.

In measuring the flow of a two component mixture, there are two unknown quantities, namely, the flow rate of each component. The essence of this invention is the use of two flowmeters with different operating principles to provide two independent equations related to the mixed flow. The two equations are solved simultaneouly to establish the individual flow rate of each component. The same principle can be extended to mixtures of more than two components. For each additional component, another independent mixture flow rate measurement must be made, in order to provide as many simultaneous equations as there are unknown quantities.

The two components of the mixture are evaluated as to mixture ratio and their flow rates. This is accomplished by conveying the mixture through two measuring stations. One measuring station involves the use of a first flowmeter whose operation is dependent on the momentum principle, such as a Venturi meter, an orifice meter, or calibrated bend and which in use of the Venturi meter, makes a first measurement and produces a differential pressure output, $\Delta p$, whose magnitude is expressed mathematically as being directly proportional to the square of the mass flow rate and directly proportional to the density of the two-component mixture.

The second measuring station through which the mixture also flows involves the use of a thermal flowmeter of the character described and claimed in U.S. Pat. No. 3,802,264 issued on Apr. 9, 1974 to Heinz F. Poppendiek and Cullen M. Sabin. It makes a second measurement and produces an electrical current output, $\Delta t$, whose magnitude is expressed mathematically as being inversely proportional to mass flow rate and also inversely proportional to the specific heat of the mixture.

These two measurements are interrelated in that they are made at the same mass flow rate because the tube conveying the mixture through the two stations is the same. The two mathematical expressions are combined so as to appear in the form of a third order polynomial equation:

$$(a-K)x^3 + bx^2 + cx + (d-K) = 0$$

in which a, b, c, and d are constant real numbers, and k changes inversely with $\Delta p$ and also inversely with $\Delta t$. Computer means is used to evaluate the mixture ratio, x, in accordance with changed values of the coefficients $(a-K)$ and $(d-K)$ and produce an output representative of the mixture ratio and also an output representative of the flow rates of the components.

An object ot the present invention is to provide means and techniques for metering a two-component mixture and producing information as to each individual component.

A specific object of the present invention is to provide a system having features outlined above.

Another specific object of the present invention is to meter the flow of a two-component mixture of the character mentioned above and to produce information as to the mixture ratio and flow rates on a continuous basis.

Another specific object of the present invention is to provide means and techniques whereby characteristics of individual components of a two-component mixture may be deduced without the necessity of separating the components.

Features of the present invention which are believed to be novel are set forth with particularity in the appended claims. The invention itself, both as to its organization and manner of operation, together with further objects and advantages thereof, may be best understood by reference to the following description taken in connection with the accompanying drawing in which:

The single FIGURE illustrates a system embodying features of the present invention.

A two-component mixture flows through the round tube 10. The flow is continuous and is indicated by arrows 12 and is successively through a first measuring station 13 and then through a second measuring station 15.

The first measuring station involves the use of a conventional Venturi meter 3 having a converging conical section 3A and a diverging conical section 3B which are interconnected by a throat or waist section 3C. One end of each tube 3D and 3E is in communication respectively with the interior of tube 10 and the interior of throat section 3C, the other ends of tubes 3D and 3E being connected to a manometer type pressure differential transducer 6 so as to measure the differential pressure $\Delta p$ which appears as an electrical current in input leads 7 and 8 of the computer means 9.

Pressure to current transducers for converting differential pressures to differential currents in flow meters are known and exemplified on pages 672 and 673 of Van Nostrand's Scientific Encyclopedia, Third Edition, January 1958.

The signal representative of $\Delta p$ is directly proportional to the square of the velocity V of the mixture and also directly proportional to d, the density of the flowing mixture. This relationship may be expressed as:

$$\Delta p = \tfrac{1}{2} C d V^2 \qquad \text{(Equation 1)}$$

in which C is a constant determined by the fixed geometry of the Venturi meter and d is the density of the mixture and V is the velocity of the mixture.

The other measuring station 15 involves the use of a thermal flowmeter of the type described and claimed in the aforementioned U.S. Pat. No. 3,802,264 which is constructed and functions to achieve an electrical output current through meter 24. In this case the current flows also in the input leads 9A and 9B to computer means 9.

The thermal transducer at station 15 as illustrated includes a heater 14 and a thermopile structure mounted on tube 10. It is contemplated that all heat from the heater 14 flows radially and uniformly inwardly into tube 10 to raise the temperature of the two-component mixture flowing therein from a relatively low temperature as sensed by a series of cold junction thermocouples 16A to a relatively high temperature as sensed by the series of hot junction thermocouples 16B.

The heater 14 is supplied with heating current which flows in the series circuit comprising: heater 14, adjustable or variable resistance 20 and voltage source 22. Regulating means (not shown) may be used to maintain the quantity of heat, q, developed in heater 14 at a constant level.

The thermocouples 16A are connected in series with each other and in series with the thermocouples 16A and in series with the meter 24 and in series with the computer leads 9A, 9B.

The thermopile 16 as well as the heater 14 are electrically insulated from each other and from tube 10 which may be of metal. For illustrative purposes the drawing includes a thin sleeve 26 of insulating material on which the thermopile 16 is wound. The thermopile 16 is generally of conventional construction and involves plating of a conducter of dissimiliar metal along selected lengths thereof. Another sleeve of insulating material 28 may surround the thermopile 16 for electrically insulating the thermopile from the heater 14. The region outide of heater 14 is thermally insulated using, for example, a heavy thick layer of good heat insulating material 30.

Nomenclature used herein includes:
$\Delta p$, differential pressure being measured
$\Delta t$, differential temperature rise being measured
A, flow crossection of tube 10
C, a constant fixed by the geometry of the Venturi meter
Cp, mean specific heat of the mixture being measured
Cp1, known specific heat of component 1 of the mixture
Cp2, known specific heat of component 2 of the mixture
d, mean density of the mixture being measured
d1, known density of component 1 of the mixture
d2, known density of component 2 of the mixture
q, heat added to mixture per unit time by heater 14
V, velocity of mixture in tube 10
w, mixture mass flow rate
w1, mass flow rate of component 1
w2, mass flow rate of component 2
x, mixture ratio, w2/w1 being evaluated in computer means
K, a changing quantity equal to $(q^2 C)/(2A^2 \Delta p \Delta t^2)$ which changes the magnitude of coefficients in a third order polynomial equation being evaluated to derive the value x.

The differential temperature $\Delta t$ is related to other quantities as follows:

$$q/\Delta t = Cpw \text{ or } \Delta t = q/(Cpw) \qquad \text{(Equation 2)}$$

In the case of slurry flow, the product Cp w may be expressed as follows:

$$Cpw = w1Cp1 + w2Cp2 \qquad \text{(Equation 3)}$$

It is noted that the mean flow rate of the mixture w and velocity V are related as follows:

$$w = dVA \qquad \text{(Equation 4)}$$

In the case of slurry flow the product, dw may be expressed as follows:

$$dw = d1w1 + d2w2 \qquad \text{(Equation 5)}$$

To simplify mathematical treatment the quantity x is defined as follows:

$$x = w2/w1 \qquad \text{(Equation 6)}$$

in which case it can be demonstrated that:

$$Cp = (Cp1 + xCp2)/(1+x) \qquad \text{(Equation 7)}$$

and, $$d = (d1 + xd2)/(1+x) \qquad \text{(Equation 8)}$$

It can be demonstrated that after combining of equations and simplification that the following third order polynomial equation is subject to evaluation:

$$(a-K)x^3 + bx^2 + cx + (d-K) = 0 \qquad \text{(Equation 9)}$$

in which the variable unknown quantity x is defined above as w2/w1 and a, b, c, and d are constant real numbers and K is defined as above.

It is noted that the two coefficients in Equation 9 that include the term K are subject to change depending upon the measurement values of $\Delta p$ and $\Delta t$, the pressure and temperature differentials. The computer means 9 to which the $\Delta p$ and $\Delta t$ signals are applied evaluates this polynomial in accordance with the magnitude of its coefficients and produces a corresponding real positive output value x, the mixture ratio, on output lead 9C. Such output signal is applied to a means 32 for either visually indicating that quantity or utilizing that quantity in, for example, a control system (not shown) for automatically controlling or regulating that ratio. Also the computer means produces an output signal on lead 90 representative of the quantity w and it may be applied to a means 33 for visually indicating the same or for achieving a control or regulating function in accordance with the magnitude of that quantity. Likewise, the magnitude of other quantities, such as, for example, w1 and w2 may be evaluated and applied via lead 9E to either indicating or control means 34.

It will be appreciated that the two measurements made above may, if desired, be made in reverse order in which case the mixture flows first through the thermal flowmeter where the quantity $\Delta t$ is evaluated and then through the other flowmeter wherein a change in mixture velocity is produced to produce a differential pressure $\Delta p$. In such case the equations set forth above are again combined and the x term in the resulting third order polynominal equation is evaluated in the computer means 9.

It is recognized that the Venturi meter principle is based on the reduction of pressure accompanied by a related increase in velocity, and that other means, other than a Venturi meter, using the above principle may be used to develope the differential pressure $\Delta p$.

While a particular embodiment of the present invention has been shown and described, it will be obvious to those skilled in the art that changes and modifications may be made without departing from the invention in its broader aspects and, therefor, the aim in the appended claims is to cover all such changes and modifications as fall within the true spirit and scope of the invention.

We claim:

1. In a two-component flow meter, the combination including:
   means defining a flow path for a two-component mixture;
   means in said path restricting flow of said mixture and producing an accompanying differential pressure between spaced regions of said path;
   means for heating said mixture as it flows from an upstream region to a downstream region to produce a differential temperature between said upstream and downstream regions; and
   means jointly responsive to said differential pressure and to said differential temperature for evaluating a characteristic of each component of said two-component mixture.

2. The combination set forth in claim 1 in which said evaluating means functions to evaluate the ratio:

$$x \text{ equals } w2/w1$$

where w2 is the mass flow rate of one of the mixture components and w1 is the mass flow rate of the other one of the mixture components.

3. The combination as set forth in claim 1 in which said restricting flow means is a Venturi meter.

4. The combination set forth in claim 1 in which said evaluating means includes computer means that evaluates the quantity x in a third order polynomial equation in which the variable quantity x is the ratio w2/w1, the mass flow rate w2 of one of the mixture components divided by the mass flow rate w1 of the other mixture component, and said equation includes coefficients whose magnitudes are dependent upon the magnitudes of said differential pressure and said differential temperature.

5. In a method for evaluating a characteristic of each component of a two-component mixture, the steps including:
   producing a change in velocity of said mixture flow and an accompanying differential pressure between spaced regions of said flow;
   heating said mixture flow to raise its temperature in its flow between an upstream region to a downstream region to produce a differential temperature between said upstream and downstream regions; and
   using said differential pressure and differential temperature to evaluate a characteristic of each component of said component flow.

6. The method set forth in claim 2 including the step of evaluating the quantity x, the mass flow rate of one of the components divided by the mass flow rate of the other one of the mixture components, in a third order polynomial equation that includes coefficients whose magnitudes are dependent upon the magnitudes of said differential pressure and said differential temperature.

* * * * *